United States Patent
Fernandes et al.

(10) Patent No.: US 12,067,429 B2
(45) Date of Patent: Aug. 20, 2024

(54) SYNCHRONIZING VARIABLE VALUES BETWEEN AN APPLICATION SHELL AND MICRO-FRONTENDS OF A WEB APPLICATION

(71) Applicant: Red Hat, Inc., Raleigh, NC (US)

(72) Inventors: Tiago Bento Fernandes, Campinas (BR); Eder Ignatowicz, Ayer, MA (US); Alexandre Porcelli Bakos, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/698,687

(22) Filed: Mar. 18, 2022

(65) Prior Publication Data
US 2023/0297444 A1    Sep. 21, 2023

(51) Int. Cl.
*G06F 3/00*    (2006.01)
*G06F 9/52*    (2006.01)
*G06F 9/54*    (2006.01)

(52) U.S. Cl.
CPC ............... *G06F 9/52* (2013.01); *G06F 9/541* (2013.01)

(58) Field of Classification Search
CPC ....................................................... G06F 9/541
See application file for complete search history.

(56) References Cited

U.S. PATENT DOCUMENTS

| | | | |
|---|---|---|---|
| 6,766,333 B1 * | 7/2004 | Wu | G06F 8/38 |
| 9,430,808 B2 | 8/2016 | Fortini et al. | |
| 9,971,748 B2 * | 5/2018 | Kim | G06F 40/143 |
| 9,971,826 B1 * | 5/2018 | Belmar | G06F 16/27 |
| 11,042,209 B2 | 6/2021 | Stoffel et al. | |
| 2006/0013367 A1 | 1/2006 | Sawyer et al. | |

(Continued)

FOREIGN PATENT DOCUMENTS

| | | |
|---|---|---|
| CN | 111209104 A | 5/2020 |
| CN | 111694633 A | 9/2020 |

(Continued)

OTHER PUBLICATIONS

Yongwu Miao, Supporting Concurrent Design by Integrating Information Sharing and Activity Synchronization. (Year: 1998).*

(Continued)

*Primary Examiner* — Lechi Truong
(74) *Attorney, Agent, or Firm* — Kilpatrick Townsend & Stockton, LLP

(57) ABSTRACT

Variable values can be synchronized between an application shell and micro-frontends by using a synchronization system described herein. In one example, an application shell that is executable in a browser window can include a first synchronization handler. The first synchronization handler can determine an updated value for a shared variable that is to be synchronized between the application shell and one or more micro-frontends in the browser window. The first synchronization handler can determine that a micro-frontend in the browser window is subscribed to receive updates for the shared variable. In response to determining that the micro-frontend is subscribed to receive the updates, the first synchronization handler can provide the updated value to a second synchronization handler of the micro-frontend for use by the micro-frontend.

21 Claims, 8 Drawing Sheets

(56) References Cited

U.S. PATENT DOCUMENTS

| | | | | |
|---|---|---|---|---|
| 2007/0198907 | A1* | 8/2007 | Degala | G06F 16/83 707/999.1 |
| 2008/0177994 | A1* | 7/2008 | Mayer | G06F 16/00 709/224 |
| 2011/0179040 | A1* | 7/2011 | Bessonov | G06F 16/955 707/747 |
| 2011/0289404 | A1* | 11/2011 | Fleur | G06F 40/169 715/255 |
| 2012/0278698 | A1* | 11/2012 | Hu | G06F 16/9577 715/234 |
| 2014/0241216 | A1* | 8/2014 | Cheng | H04M 1/2746 370/271 |
| 2015/0256504 | A1* | 9/2015 | Beausoleil | H04L 51/42 709/206 |
| 2018/0121217 | A1* | 5/2018 | Jarabek | G06F 9/546 |
| 2018/0314308 | A1 | 11/2018 | Savidis et al. | |
| 2021/0064675 | A1 | 3/2021 | Church et al. | |
| 2021/0247882 | A1 | 8/2021 | Norman et al. | |
| 2021/0279403 | A1* | 9/2021 | Strimpel | H04L 67/564 |
| 2021/0365290 | A1 | 11/2021 | Zhang et al. | |
| 2023/0066058 | A1* | 3/2023 | Yadav | G09B 19/0053 |

FOREIGN PATENT DOCUMENTS

| | | |
|---|---|---|
| CN | 112217671 A | 1/2021 |
| CN | 112363857 B | 4/2021 |
| CN | 113254050 A | 8/2021 |
| CN | 113434034 A | 9/2021 |
| CN | 113626124 A | 11/2021 |
| CN | 113783929 A | 12/2021 |
| KR | 20210157246 A | 4/2021 |

OTHER PUBLICATIONS

Akiyo Nadamoto, A Comparative Web Browser (CWB) for Browsing and Comparing Web Pages. (Year: 2003).*

Kazuyuki Tasaka, A Web Synchronization Method for Supporting Real and Non-Real-Time Web Communication. (Year: 2013).*

Nur Adibah Rosli, Clustering Analysis for Malware Behavior Detection using Registry Data.*

U.S. Appl. No. 17/372,783 , "Non-Final Office Action", Sep. 22, 2022, 16 pages.

Mehta, H. K., et al., "WattsApp: Power-Aware Container Scheduling," Association for Computing Machinery, 2020, https://doi.org/10.1145/1122445.1122456.

U.S. Appl. No. 17/372,783, filed Jul. 12, 2021, Red Hat, Inc.

"Gracefully scaling web applications with micro-frontends: Part II," Collective Health, Jan. 13, 2020, https://eng.collectivehealth.com/gracefully-scaling-web-applications-with-micro-frontends-part-ii-8fa730d05b14.

"Using channel messaging," Web APIs, MDN Web Docs, downloaded on Jun. 21, 2021, https://developer.mozilla.org/en-US/docs/Web/API/Channel_Messaging_API/Using_channel_messaging.

"These are chat archives for angular/angular," Gitter—Jan. 12, 2018, https://gitter.im/angular/angular/archives/2018/01/12?at=5a58ae79ae53c15903dc3168.

"6 Steps to your Angular-based Microfrontend Shell," Angular Architects, Nov. 22, 2019, angulararchitects.io/en/aktuelles/6-steps-to-your-angular-based-microfrontend-shell/.

Mezzalira, L., "Building Micro-Frontends, Chapter 4. Discovering Micro-Frontend Architectures," O'Reilly Media, Inc., 2021.

Peltonen, S., et al., "Motivations, Benefits, and Issues for Adopting Micro-Frontends: A Multivocal Literature Review," Information and Software Technology, 2021.

* cited by examiner

SYNCHRONIZING VARIABLE VALUES BETWEEN AN APPLICATION SHELL AND MICRO-FRONTENDS OF A WEB APPLICATION

TECHNICAL FIELD

The present disclosure relates generally to micro-frontend architectures for web applications. More specifically, but not by way of limitation, this disclosure relates to a synchronization system for synchronizing variable values between an application shell and micro-frontends of a web application.

BACKGROUND

Microservices have become increasingly popular given their ability to avoid the limitations of large, monolithic backends. Similar principles are now being applied to the frontend with the advent of micro-frontend architectures. Micro-frontend architectures decompose complex frontend monoliths into smaller components called micro-frontends, which can be developed, tested, and deployed independently of one another. Micro-frontends can scale better, can be upgraded faster, and can be developed more autonomously than monolithic frontends.

A micro-frontend architecture can include an application shell and one or more micro-frontends for display in a website browser. The application shell can serve as a container or wrapper around the micro-frontends. Each micro-frontend can serve as a frontend interface for a corresponding backend application that provides one or more backend services supporting the overall web application. Within the website browser, the application shell can serve as a centralized coordinator for organizing and interfacing with the micro-frontends. For example, the application shell can identify and interact with micro-frontends based on user interactions with the website browser, organize the micro-frontends to provide a certain visual appearance, and configure the micro-frontends to provide certain functionality.

DETAILED DESCRIPTION

Figure 1:
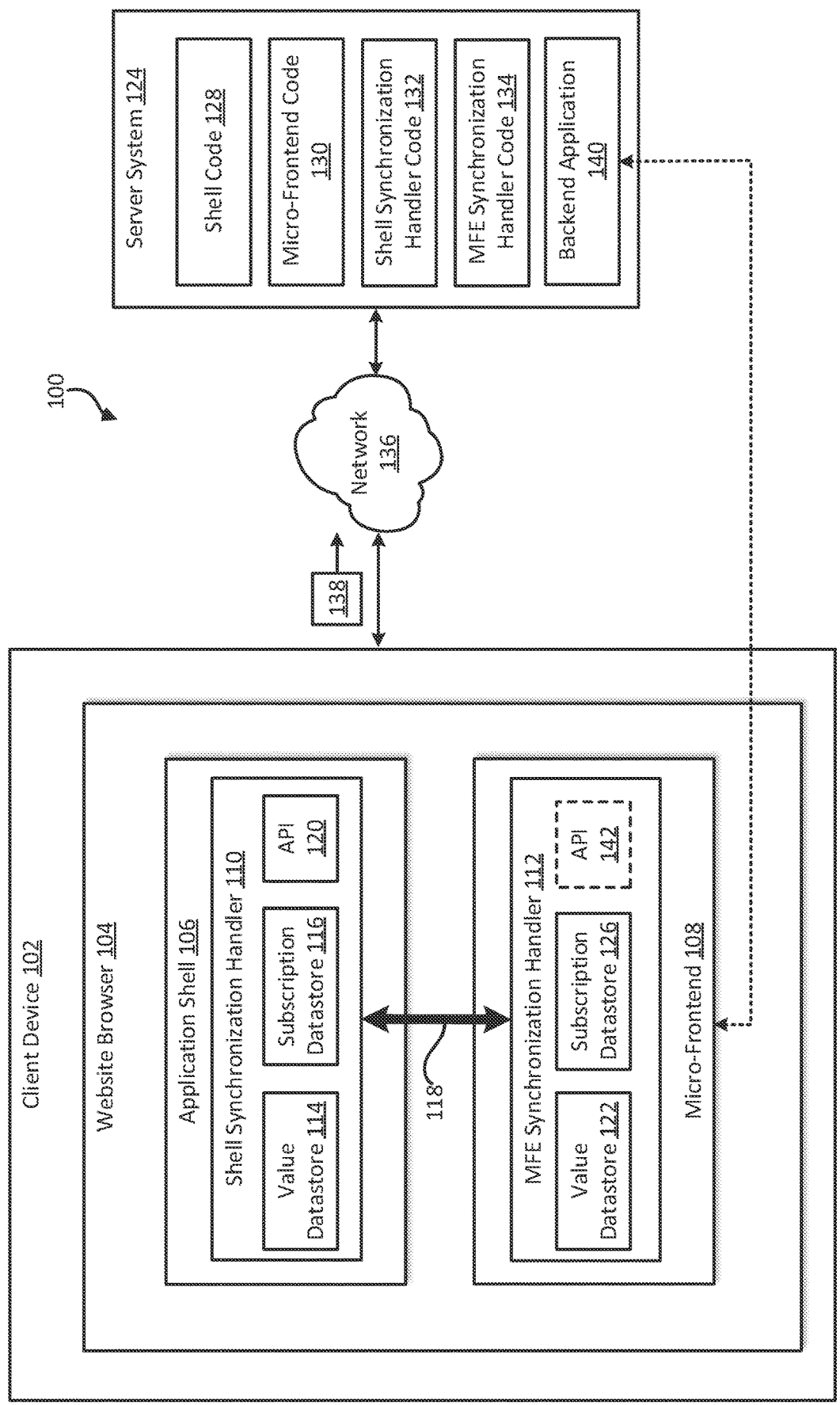
FIG. 1 shows a block diagram of an example of a system for implementing some aspects of the present disclosure.

Micro-frontend architectures are becoming increasingly prevalent in the development of websites and other web applications. In a common scenario, a client device can transmit a webpage request to a webserver via a website browser. The webserver can respond to the webpage request by providing program code for an application shell ("shell") and for one or more micro-frontends to the client device for rendering in a browser window. The program code may include HTML, CSS, JavaScript, or any combination of these. Once rendered, the shell and the micro-frontends may cooperate to implement one or more frontend functions of the web application.

In some scenarios, the shell and the micro-frontends can perform operations relatively independently of one another. For example, the shell may compute a first value for a variable and a micro-frontend may compute a second value for the same variable. But, such inconsistencies between variable values in the same overall web application can lead to problems, such as errors and operability issues. For example, the web application may output the first value in a first portion of a user interface and the second value in a second portion of the user interface, which may be confusing to users. And if the inconsistent values are used by the shell and micro-frontend in further operations, there can be a cascading impact on the quality and operability of the web application.

Some examples of the present disclosure can overcome one or more of the abovementioned problems by providing a synchronization system to enable an application shell and one or more micro-frontends to easily synchronize their variable values with one another. In particular, the synchronization system can include a shell synchronization handler for use by the shell. The synchronization system can also include a micro-frontend (MFE) synchronization handler for use by a micro-frontend. The shell synchronization handler and the MFE synchronization handler can be executable within a browser window. The MFE synchronization handler and the shell synchronization handler can cooperate to share updates to values of a certain shared variable. A shared variable is a variable that is to be synchronized between the shell and a micro-frontend. If the application shell then modifies the value for the shared variable, the shell synchronization handler can transmit the updated value to the MFE synchronization handler via a communication channel. An example of the communication channel may be a messaging bus, which may be internal to or external to the browser window. The MFE synchronization handler can then receive and store the modified (e.g., updated) value for use by the micro-frontend. For example, the MFE synchronization handler can provide the modified value to one or more subscribed components of the micro-frontend, so that the subscribed components can make use of the modified value. A subscribed component can be a component (e.g., a DOM object) of the micro-frontend that is registered with the MFE synchronization handler to receive updates to a particular shared variable.

Modifications to the shared variable can also be transmitted in the opposite direction. For example, if the micro-frontend modifies the shared variable's value, the MFE synchronization handler can automatically transmit the updated value to the shell synchronization handler via the communication channel. The shell synchronization handler can then receive and store the modified value for use by the shell. For example, the shell synchronization handler can provide the modified value to one or more subscribed components of the application shell, so that the subscribed components can make use of the modified value. In this manner, the shell and the micro-frontend can bi-directionally communicate to automatically inform each other of updates to a shared variable's value, so that they can remain in synch with one another.

In some examples, micro-frontends can also expose shared variables using a similar process to the application shell. For example, the shell synchronization handler can communicate with the MFE synchronization handler to determine which shared variables are exposed. One or more components of the application shell can then subscribe with the shell synchronization handler to receive updates to a shared variable exposed by the MFE synchronization handler. If the micro-frontend then modifies the value for the shared variable, the MFE synchronization handler can automatically transmit the updated value to the shell synchronization handler via the communication channel. The shell synchronization handler can then receive and store the modified value for use by the application shell. For example, the shell synchronization handler can also provide the modified value to the one or more subscribed components of the application shell for use by the subscribed components. The process may also work in reverse. For example, if the shell modifies the value for the shared variable, the shell synchronization handler can automatically transmit the updated value to the MFE synchronization handler via the communication channel. The MFE synchronization handler can then receive and store the modified value for use by the micro-frontend. For example, the MFE synchronization handler can also provide the modified value to the one or more subscribed components of the micro-frontend for use by the subscribed components.

In the above examples, the synchronization handlers can engage in the communications on behalf of the shell and the micro-frontend to synchronize the values of a shared variable. As a result, the shell and micro-frontend may not need to be specifically configured for communicating in any particular way or for any particular browser context. Rather, the specific communication-logic that is typically programmed into shells and micro-frontends can be replaced with more generic and uniform logic for interfacing with the synchronization handlers. This can simplify the development of shells and micro-frontends, reduce compatibility problems, and reduce code duplication. And because the synchronization handlers can transmit messages to one another over a shared communication channel that may not have the same limits imposed thereon as browser contexts (e.g., which often have strict limits imposed thereon by the website browser), the synchronization handlers may be able to freely communicate with one another according to any suitable messaging scheme. This may enable a shell application to communicate with micro-frontends in different browser contexts, which may be challenging or impossible using conventional mechanisms.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for implementing some aspects of the present disclosure. The system 100 can include a client device 102, such as a laptop computer, a desktop computer, a mobile phone, or a tablet. The system 100 can also include a server system 124, which in some examples may be a cloud-computing platform with scalable resources. The server system 124 can communicate with the client device 102 via a network 136, such as a local area network or the Internet.

The client device 102 can execute a website browser 104 to run a web application provided by the server system 124. Although the web application may include both client-side and server-side components, the website browser 104 may be considered to be running the web application if the website browser 104 is executing one or more client-side components of the web application. The web application can include an application shell 106 and one or more micro-front ends, such as micro-frontend 108. Each micro-frontend can correspond to a backend application on the server system 124. For example, the micro-frontend 108 can correspond to backend application 140, as represented by the dashed arrow. The backend application 140 can provide services to support the micro-frontend 108.

The server system 124 can provide the web application to the client device 102 upon request. For example, the client device 102 can transmit a website request 138 (e.g., an HTTP request) via the website browser 104 to access a particular web application of the server system 124. The server system 124 may include a webserver configured to handle such requests. The server system 124 can receive the website request 138 and responsively provide program code for the web application to the website browser 104. The program code can be in any suitable programming language, such as HTML, CSS, JavaScript, etc. The program code can be for running client-side components of the web application.

In this example, the program code can include shell code 128 and micro-frontend code 130. The shell code 128 can be executable by the website browser 104 of the client device 102 to run an application shell 106. The micro-frontend code 130 can be executable by the website browser 104 to run a micro-frontend 108. When running in the browser window, the micro-frontend 108 may be a child of the application shell 106 in a document object model (DOM) hierarchy.

The application shell 106 can display a frontend for the web application in a display area of the website browser 104. The frontend can be formed from one or more micro-frontends, such as micro-frontend 108, arranged in the display area of the website browser 104. Within the website browser 104, the application shell 106 may be in a browser context that is distinct from one or more browser contexts of the micro-frontends. In some cases, the application shell 106 can be a single page application that is dynamically updated (e.g., without fully reloading the page). For example, after providing an initial web page document to the website browser 104 in response to a page load request received from the website browser 104, the application shell 106 may be dynamically updated without requiring the website browser 104 to load an entirely new page. This may be achieved using asynchronous JavaScript and XML (AJAX) calls or other techniques. In the single page architecture, the application shell 106 can dynamically replace the micro-frontend that is currently displayed in website browser 104 with another micro-frontend, for example in response to a user interaction with the website browser 104.

In some examples, the program code provided by the server system 124 can also include shell synchronization handler code 132 and micro-frontend (MFE) synchronization handler code 134. The shell synchronization handler code 132 can be executable by the website browser 104 to run a shell synchronization handler 110. The MFE synchronization handler code 134 can be executable by the website browser 104 to run a MFE synchronization handler 112. The shell synchronization handler 110 and the MFE synchronization handler 112 can collectively form a synchronization system for enabling the application shell 106 to synchronize variable values with the micro-frontend 108. The application shell 106 and the micro-frontend 108 can rely on (e.g., invoke) the shell synchronization handler 110 and the MFE synchronization handler 112, respectively, to engage in such synchronization.

In particular, the website browser 104 may first initialize the shell synchronization handler 110 associated with the application shell 106. This may involve generating a value datastore 114 and a subscription datastore 116 for use by the shell synchronization handler 110. Examples of the datastores 114, 116 can include arrays, primitives, objects, databases, or other data structures. An application programming interface (API) 120 of the shell synchronization handler 110 may also be initialized. The API 120 can be programmed to expose one or more shared variables for synchronization. For example, the API 120 can be programmed with a unique name and a default value for each shared variable. Each share variable may be exposed via the API 120 as an object with corresponding properties. One example of the API 120 can be as follows:

```
interface MyAppShellAPI {
    SharedValueA( ): SharedValueProvider<string>
}
class MyAppShellAPIImpl {
    public sharedValueA( ): SharedValueProvider<string> {
        return { defaultValue: "default_A" };
    }
}
```

The above example involves an object named "SharedValueProvider" that is created for a shared variable named "sharedValueA." The "SharedValueProvider" object has a property called "defaultValue," which is assigned a default value for the shared variable. In this example, the default value is set to "default_A," but any suitable default value may be chosen. A developer of the API 120 may select which shared variables to expose and their default values. It will be appreciated that although this example involves one shared variable for simplicity, any number of shared variables may be exposed via the API 120 using these techniques.

After initiating the shell synchronization handler 110, the website browser 104 can initialize the MFE synchronization handler 112. This may involve generating a value datastore 122 and a subscription datastore 126 for use by the MFE synchronization handler 112. Examples of these datastores 122, 126 can include arrays, primitives, objects, databases, or other data structures. The MFE synchronization handler 112 may also initiate its own API 142, if the micro-frontend 108 is going to share one or more of its variable values with the application shell 106 or another micro-frontend in the website browser 104. The API 142 may be initialized and configured using a similar process as described above for API 120.

Once the MFE synchronization handler 112 is initialized, it may subscribe to receive updates for one or more shared variables exposed by the shell synchronization handler 110. For example, the MFE synchronization handler 112 may execute a "subscribe" method for the shared variable sharedValueA, as shown below:

```
const mfe_subscription =
    MFEsynchHandler.appShellAPI.shared.sharedValueA.subscribe((v) =>
    {
        console.log(v);
    });
```

Since no new value has been set yet for sharedValueA, when the above code executes, the default value ("default_A") provided by the application shell's API 120 will be logged to the console for access by the MFE synchronization handler 112. In this way, the MFE synchronization handler 112 can obtain the default value for the shared variable.

During the subscription process, the shell synchronization handler 110 can also generate entries in the subscription datastore 116 indicating that the MFE synchronization handler 112 is subscribed to receive updates for the one or more shared variables. For example, the shell synchronization handler 110 can generate an entry in the subscription datastore 116 indicating that the MFE synchronization handler 112 is subscribed to receive updates for sharedValueA. The entry may store a callback associated with the micro-frontend 108 and the shared variable. Similarly, the MFE synchronization handler 112 can generate entries in the subscription datastore 126 indicating that the MFE synchronization handler 112 is subscribed to receive updates for the one or more shared variables. For example, the MFE synchronization handler 112 can generate an entry in the subscription datastore 126 indicating that the MFE synchronization handler 112 is subscribed to receive updates for SharedValueA.

Although the application shell 106 is acting as a shared variable provider in this example, it is also possible for the application shell 106 to subscribe to changes for one or more shared variables that it is providing. For example, the application shell 106 can also execute the following "subscribe" method to subscribe to receive updates for sharedValueA:

```
const appShell_subscription =
    ShellSynchHandler.shared.sharedValueA.subscribe((v) =>
    {
        console.log(v);
    });
```

When the application shell 106 subscribes to a shared variable, the shell synchronization handler 110 can generate an entry in the subscription datastore 116 indicating that the application shell 106 is subscribed to receive updates for the shared variable. For example, the shell synchronization handler 110 can generate an entry in the subscription datastore 116 indicating that the application shell 106 is subscribed to receive updates for sharedValueA. The entry may store a callback associated with the application shell 106 and the shared variable.

After one or both of the micro-frontend 108 and the application shell 106 registers a subscription to the one or more shared variables, the values of the one or more shared variables may be updated. In some cases, the application shell 106 may update the value of a shared variable. For instance, the application shell 106 can execute the following "set" method to update the value of sharedValueA:ShellSynchHandlershared.sharedSet ("New_Value"). In other cases, the micro-frontend 108 can update the value of a shared variable. For instance, the micro-frontend 108 can execute the following "set" method to update the value of sharedValueA: MFEsynchHandlerappShellAPI.shared-.sharedValueA.Set ("New_Value"). If either the application shell 106 or the micro-frontend 108 update sharedValueA through the "set" method, the application shell 106 and the micro-frontend 108 can log the updated value to their consoles based on the code described above.

Each time the "set" method is called by the application shell 106 to update the value of a shared variable, the shell synchronization handler 110 can store the updated value in the value datastore 114. The value datastore 114 may be local to the shell synchronization handler 110 and inaccessible to the micro-frontend 108 (and its MFE synchronization handler 112). The shell synchronization handler 110 can then determine which micro-frontends are subscribed to the shared variable in the subscription datastore 116, and transmit the updated value to those micro-frontends. For example, the shell synchronization handler 110 can consult the subscription datastore 116 to determine that the micro-frontend 108 is subscribed to receive updates for the shared variable "sharedValueA." Based on identifying this subscription, the shell synchronization handler 110 can transmit an updated value for "sharedValueA" to the micro-frontend 108. For example, the shell synchronization handler 110 can call a registered callback in the subscription datastore 116 with the updated value.

In some examples, the shell synchronization handler 110 can transmit the updated value to the micro-frontend 108 by transmitting a message via a communication channel 118 that is accessible to the MFE synchronization handler 112 of the micro-frontend 108. For instance, the message may be transmitted using "window.postMessage," which can be a browser-native method. The message can contain the new value and a descriptor, such as "SHARED_VARIABLE_UPDATE," indicating that the message contains an update to a shared variable.

The MFE synchronization handler 112 can receive the message with the updated value and responsively store the updated value for the shared variable in the value datastore 122. The value datastore 122 may be local to the MFE synchronization handler 112 and inaccessible to the application shell 106 (and its shell synchronization handler 110). In this way, the value of a shared variable can automatically be synchronized between the application shell 106 and the micro-frontend 108 each time the application shell 106 updates the value.

A similar process can happen in reverse. Each time the "set" method is called by the micro-frontend 108 to update the value of a shared variable, the MFE synchronization handler 112 can store the updated value in the value datastore 122. The MFE synchronization handler 112 can then transmit an updated value to the application shell 106, for example by transmitting a message via the communication channel 118. In some examples, the message may be transmitted using "window.postMessage." The message can contain the new value and a descriptor, such as "SHARED_VARIABLE_UPDATE," indicating that the message contains an update to a shared variable. The shell synchronization handler 110 can receive the message with the updated value and responsively store the updated value for the shared variable in the value datastore 114. In this way, the value of a shared variable can automatically be synchronized between the application shell 106 and the micro-frontend 108 each time the micro-frontend 108 updates the value.

In some examples, the micro-frontend 108 can unsubscribe from receiving updates to the one or more shared variables. For example, the micro-frontend 108 can execute an "unsubscribe" method as follows:

```
MFEsynchHandler.appShellAPI.shared.sharedValueA.unsubscribe(
    mfe_subscription
);
```

This cause the shell synchronization handler 110 to remove the corresponding entry from its subscription datastore 116. For example, the shell synchronization handler 110 can remove a corresponding callback from its subscription datastore 116. The MFE synchronization handler 112 may also remove the corresponding entry from its subscription datastore 126. In this way, the micro-frontend 108 can subscribe to a given shared variable and unsubscribe to a given shared variable as desired.

The application shell 106 can also unsubscribe from receiving updates to the one or more shared variables. For example, the application shell 106 can execute an "unsubscribe" method as follows:

```
ShellSynchHandler.shared.sharedValueA.unsubscribe(
    appShell_subscription
);
```

This cause the shell synchronization handler 110 to remove the corresponding entry from its subscription datastore 116. For example, the shell synchronization handler 110 can remove a corresponding callback from its subscription datastore 116. In this way, the application shell 106 can subscribe to a given shared variable and unsubscribe to a given shared variable as desired.

As noted above, the micro-frontend 108 may also be capable of exposing one or more shared variables for synchronization with the application shell 106 or other micro-frontends. For example, MFE synchronization handler 112 can include its own API 142 that can function similarly to the API 120 of the shell synchronization handler 110. In particular, the API 142 can control which variables are to be shared. The API 142 can also set the default values for the variables. The application shell 106 or other micro-frontends can then subscribe with the MFE synchronization handler 112 to receive updates to the shared variables, for example using a similar process as described above. The rest of the synchronization process may also be similar to the one described above. For example, each time the "set" method is called by the micro-frontend 108 to update the value of a shared variable, the MFE synchronization handler 112 can store the updated value in the value datastore 122. The MFE synchronization handler 112 can then transmit an updated value to the application shell 106 or to another micro-frontend, for example by transmitting a message via the communication channel 118. The recipient's synchronization handler can receive the message with the updated value and responsively store the updated value for the shared variable in its value datastore. In this way, the value of the shared variable can automatically be synchronized with the application shell 106 and other micro-frontends.

Although FIG. 1 shows a certain number and arrangement of components, this is intended to be illustrative and non-limiting. Other examples may include more components, fewer components, different components, or a different arrangement of the components shown in FIG. 1. For instance, in other examples the shell synchronization handler code 132 can be incorporated into the shell code 128

(e.g., upon transmission to the client device 102), so that the shell synchronization handler 110 runs as a subpart of the application shell 106 in the website browser 104. Additionally or alternatively, the MFE synchronization handler code 134 can be incorporated into the micro-frontend code 130 (e.g., upon transmission to the client device 102), so that the MFE synchronization handler 112 runs as a subpart of the micro-frontend 108 in the website browser 104.

Figure 2:
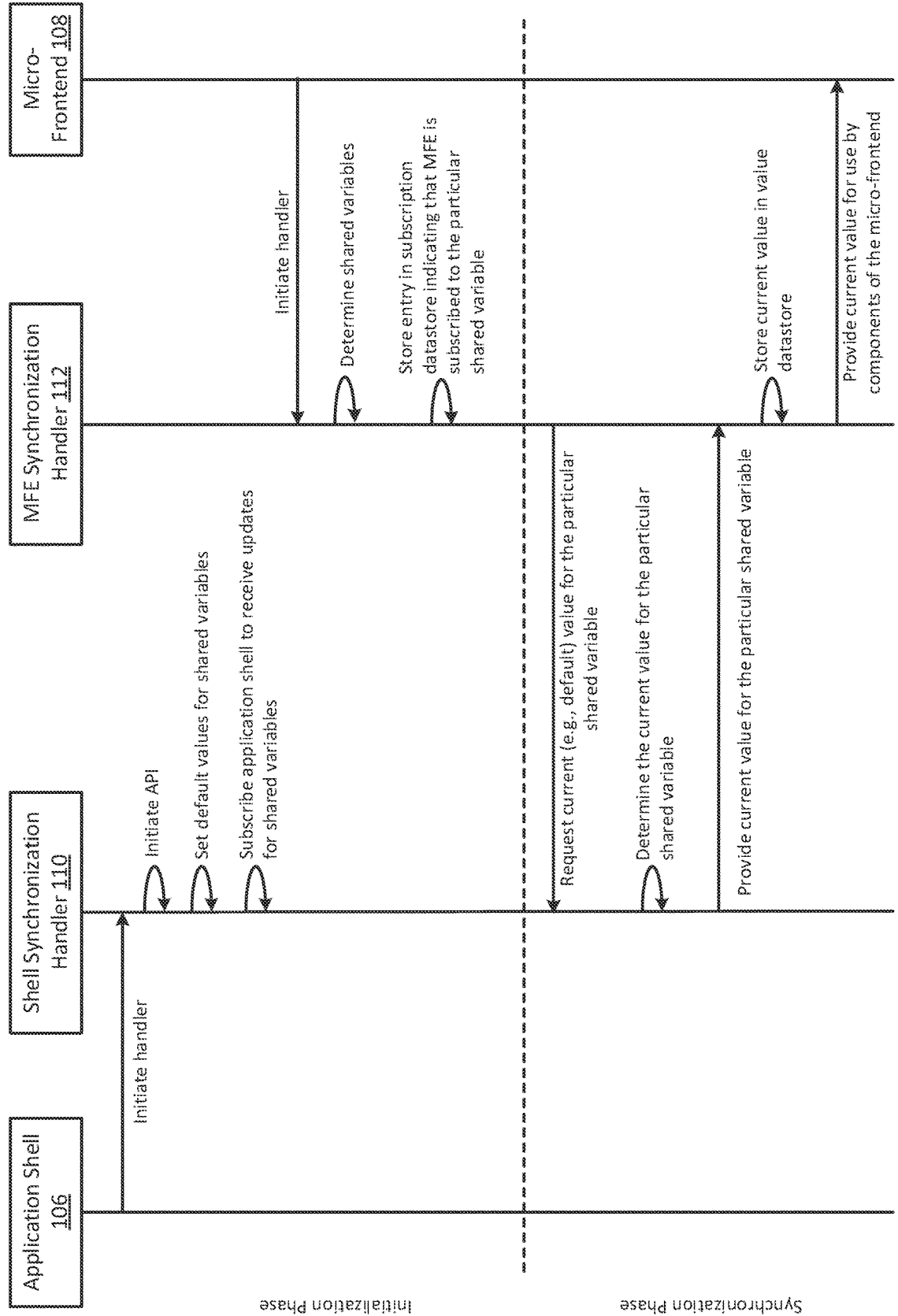
FIG. 2 shows a sequence diagram of an example of a process for subscribing a micro-frontend to receive updates for a shared variable according to some aspects of the present disclosure.

FIG. 2 shows a sequence diagram of an example of a process for subscribing a micro-frontend 108 to receive updates for a shared variable according to some aspects of the present disclosure. The process can begin with the application shell 106 initializing the shell synchronization handler 110. The shell synchronization handler 110 can then initiate its application programming interface (API), which can be similar to the API 120 of FIG. 1. Part of this initialization process may involve determining which variables are to be shared variables and the default values for the shared variables. The shared variables and their default values may be preselected and programmatically entered. The shared variables can then be set to their default values, for example through the creation of objects (e.g., in the object-oriented programming sense) with default-value properties set to the default values.

In some examples, the application shell 106 may subscribe to receive updates in relation to one or more of the shared variables. For example, the shell synchronization handler 110 can store an entry in its subscription datastore 116 indicating that the application shell 106 is to receive updates in relation to a particular shared variable. That way, if another component (e.g., a micro-frontend 108) makes an update to the shared variable's value, the application shell 106 will be automatically notified of the update.

The micro-frontend 108 can also initiate its MFE synchronization handler 112. Part of this initialization process may involve the MFE synchronization handler 112 determining which shared variables are to be synchronized with the application shell 106. To do so, the MFE synchronization handler 112 can communicate with an API of the shell synchronization handler 110 to determine which shared variables it has exposed for synchronization.

After determining which shared variables are to be synchronized, the MFE synchronization handler 112 can subscribe to a particular shared variable. To do so, the MFE synchronization handler 112 may store an entry in its own subscription datastore 126. The entry may indicate that the micro-frontend 108 is to receive updates in relation to the particular shared variable. For example, the entry can include a callback function associated with one or more components of the micro-frontend 108, where the callback function is configured to be called in response to updates to the particular shared variable. This may conclude an initialization phase, as indicated by a dashed horizontal line in FIG. 2.

Next, the system may enter a synchronization phase for synchronizing the value of the particular shared variable. Since the MFE synchronization handler 112 may not already have a value stored for the particular shared variable, the synchronization process can begin with the MFE synchronization handler 112 requesting a current value for the particular shared variable. In response to this request, the shell synchronization handler 110 can determine the current value for the particular shared variable. To do so, the shell synchronization handler 110 can check its value datastore 114 to determine whether a value is already present therein for the shared variable. In some examples, the value datastore 114 may initially be empty, and values for shared variables may only be added to the value datastore 114 once those values are updated from their default values. If value datastore 114 already has a value for the shared variable, the shell synchronization handler 110 can retrieve and return that value as the current value for the shared variable. If value datastore 114 does not have a value for the shared variable, the shell synchronization handler 110 can communicate with its API to retrieve and return the default value for the shared variable. The MFE synchronization handler 112 can then store the current value in its own value datastore 122 for use by one or more components of the micro-frontend 108. In this manner, the micro-frontend 108 can be provided with the most current value for the shared variable, which can help synchronize it with the application shell 106.

Figure 3:
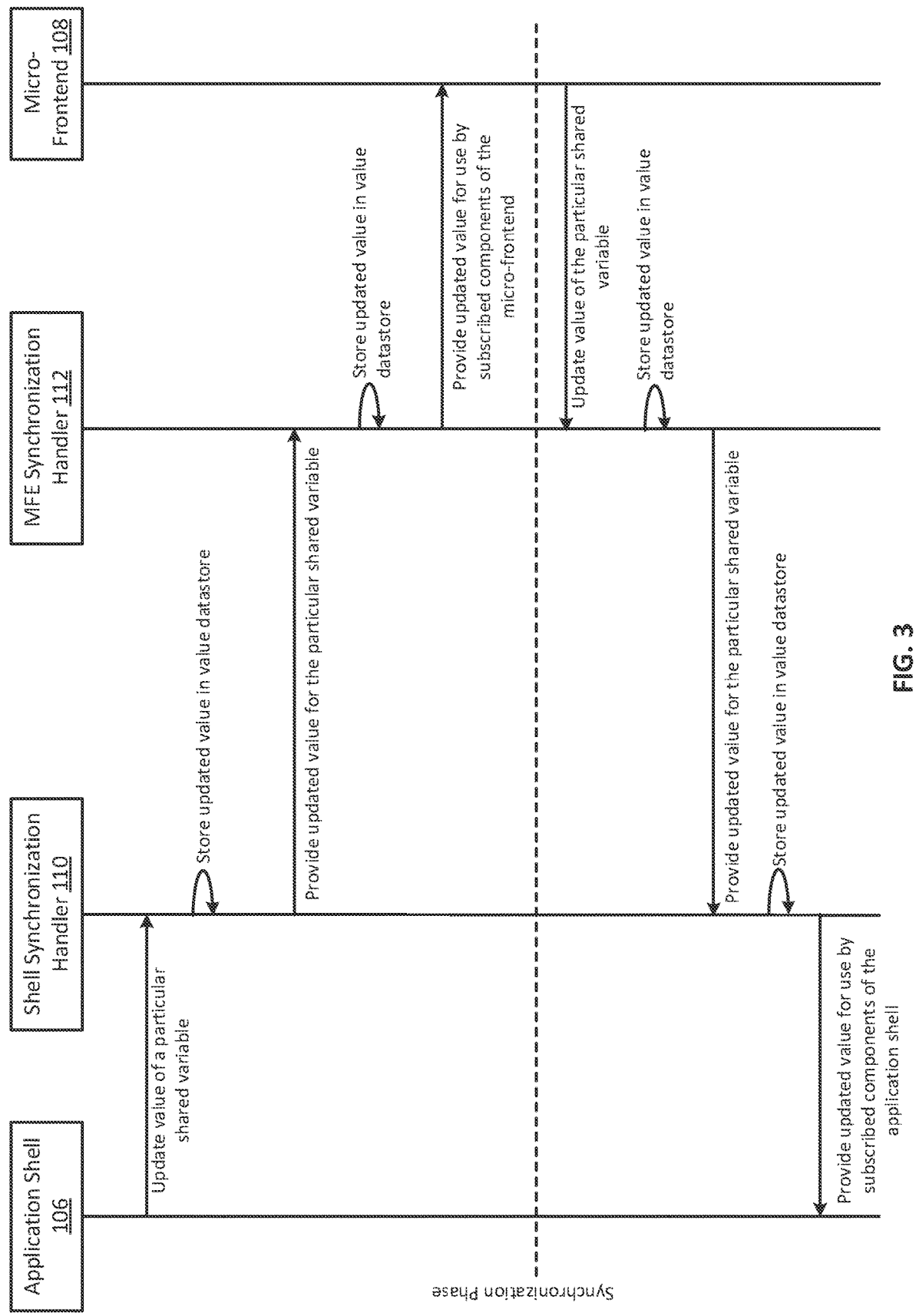
FIG. 3 shows a sequence diagram of an example of a process for synchronizing an updated value of a shared variable according to some aspects of the present disclosure.

FIG. 3 shows a sequence diagram of an example of a process for synchronizing an updated value of a shared variable according to some aspects of the present disclosure. This process may be considered a continuation of the synchronization phase depicted in FIG. 2.

The process can begin with the application shell 106 generating an updated value for a particular shared variable. The application shell 106 can provide the updated value to the shell synchronization handler 110, which can store the updated value in its value datastore 114. The shell synchronization handler 110 can then transmit the updated value for the shared variable to the MFE synchronization handler 112 via a communication channel 118. The MFE synchronization handler 112 can then receive the updated value and store the updated value in its value datastore 122. After receiving the updated value, the MFE synchronization handler 112 may provide the updated value to one or more components of the micro-frontend 108 that are subscribed to receive the updated value in the subscription datastore 126. For example, the MFE synchronization handler 112 may provide the updated value to a subscribed component of the micro-frontend 108 by executing a related callback stored in the subscription datastore 126.

In some examples, the above update process can be repeated for multiple micro-frontends. For example, there can be multiple MFE synchronization handlers associated with multiple micro-frontends. The MFE synchronization handlers may concurrently monitor the communication channel 118 for messages. Upon detecting a message (e.g., from the shell synchronization handler 110) indicating an updated value for the particular shared variable, each MFE synchronization handler can retrieve the updated value from the message. Each MFE synchronization handler can then store the updated value in its own value datastore and provide the updated value to one or more subscribed components.

The sequence can also operate in reverse, so that micro-frontends can update the application shell about changes to a shared variable's value. These two sequences are separated by a dashed line in FIG. 3. As shown, the process can begin with the micro-frontend 108 generating an updated value for the particular shared variable. The micro-frontend 108 can provide the updated value to the MFE synchronization handler 112, which can store the updated value in its value datastore 122. The MFE synchronization handler 112 can then broadcast the updated value for the shared variable to the shell synchronization handler 110 via a communication channel 118. The shell synchronization handler 110 can then receive the updated value and store the updated value in its value datastore 114. After receiving the updated value, the shell synchronization handler 110 may provide the updated value to one or more subscribed components of the application shell 106. For example, the shell synchronization handler 110 may provide the updated value to a subscribed component of the application shell 106 by executing a related callback stored in the subscription datastore 116.

Figure 4:
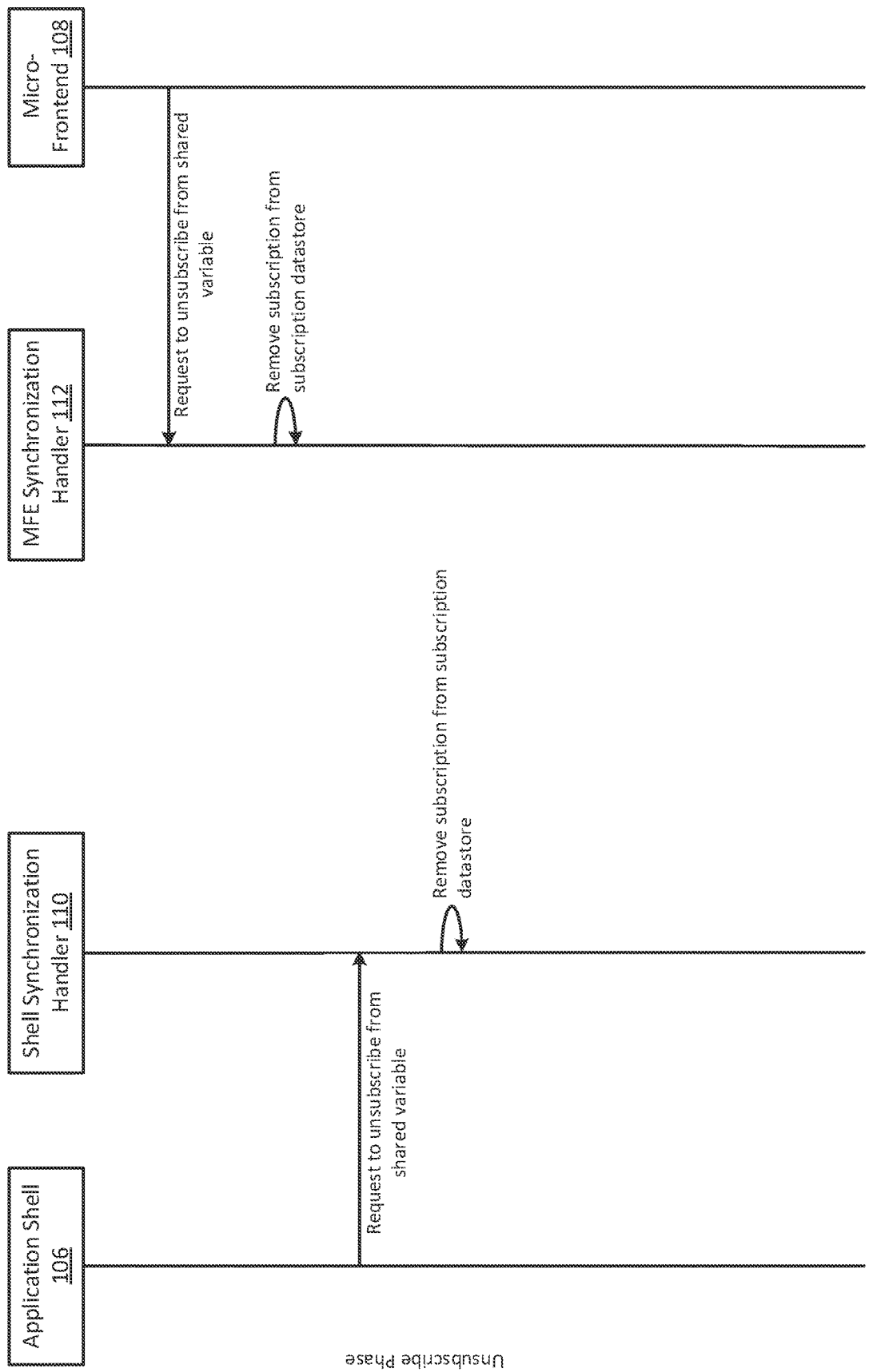
FIG. 4 shows a sequence diagram of an example of processes for unsubscribing from a shared variable according to some aspects of the present disclosure.

FIG. 4 shows a sequence diagram of an example of processes for unsubscribing from a shared variable according to some aspects of the present disclosure. For example, the micro-frontend 108 can transmit a request to the MFE synchronization handler 112 to unsubscribe from receiving updates for a particular shared variable. The MFE synchronization handler 112 can receive the request and remove one or more corresponding entries from its subscription datastore 126. As a result, the MFE synchronization handler 112 may no longer execute the corresponding callbacks in response to updates to the shared variable. But, the MFE synchronization handler 112 may still store the update values in the value datastore 122.

Additionally or alternatively, the application shell 106 can transmit a request to the shell synchronization handler 110 to unsubscribe from receiving updates for a particular shared variable. The shell synchronization handler 110 can receive the request and remove one or more corresponding entries from its subscription datastore 116. As a result, the shell synchronization handler 110 may no longer execute the corresponding callbacks in response to updates to the shared variable. But, the shell synchronization handler 110 may still store the update values in the value datastore 114.

Figure 5:
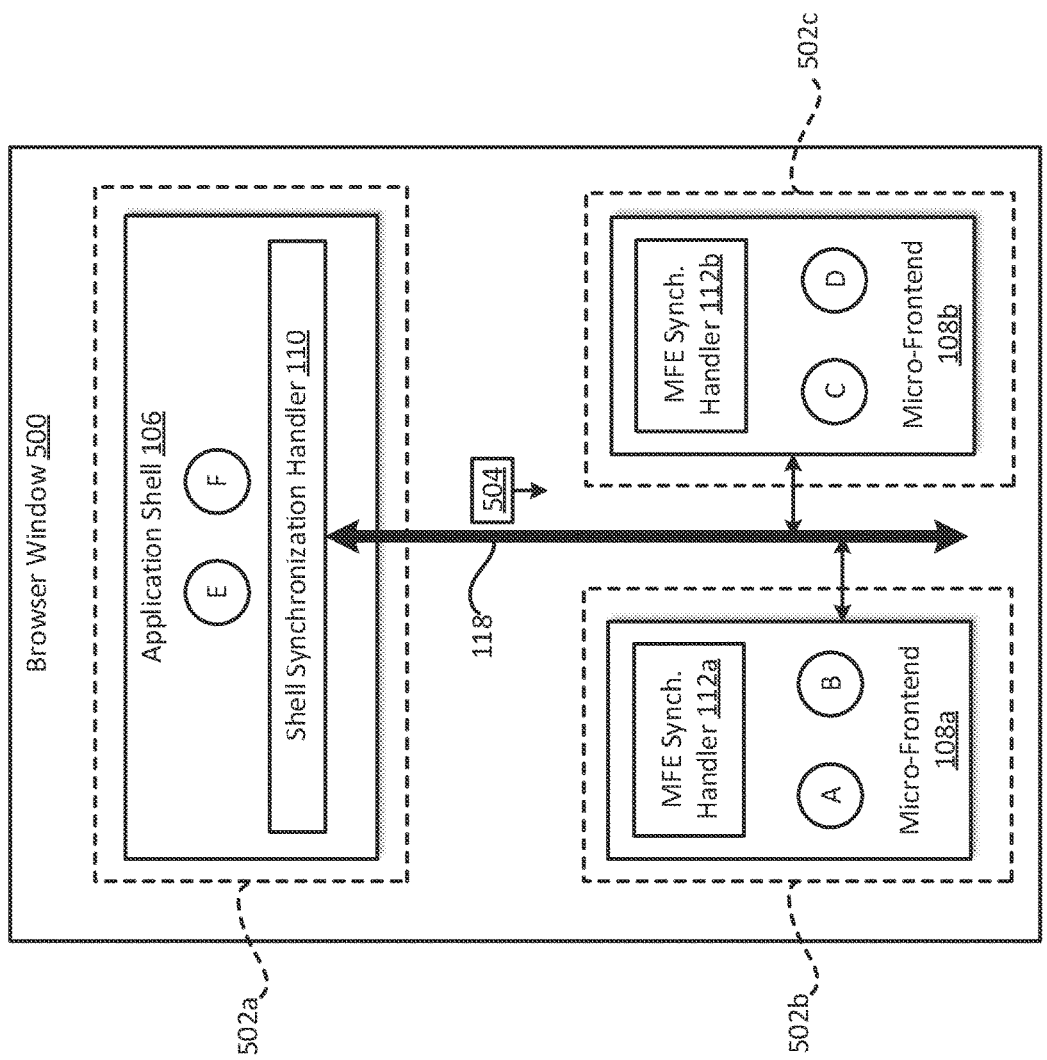
FIG. 5 shows a block diagram of an example of a browser window in which a single application shell can synchronize variable values with multiple micro-frontends according to some aspects of the present disclosure.

FIG. 5 shows a block diagram of an example of a browser window 500 in which a single application shell 106 can synchronize variable values with multiple micro-frontends 108a-b according to some aspects of the present disclosure. In this example, the application shell 106 can include a shell synchronization handler 110 and the micro-frontends 108a-b can include their own MFE synchronization handlers 112a-b. The shell synchronization handler 110 can communicate with the MFE synchronization handlers 112a-b via the communication channel 118, and vice-versa.

The application shell 106 and micro-frontends 108a-b can be in browser contexts 502a-c that may be the same as or different from one another. For example, the application shell 106 may be in a first browser context 502a, the micro-frontend 108a may be in a second browser context 502b, and the micro-frontend 108b may be in a third browser context 502c. In some such examples, the first browser context 502a may be a first iFrame, the second browser context 502b may be a second iFrame, and the third browser context 502c may be a <div>. The synchronization handlers 110, 112a-b may be capable of synchronizing variable values between the application shell 106 and the micro-frontends 108a-b regardless of their contexts, given the use of the communication channel 118.

Each of the micro-frontends 108a-b may have its own components (e.g., DOM objects) that may be substantially isolated from the other components of the other micro-frontend. That is, a change to one component of one micro-frontend 108a may not impact another component of another micro-frontend 108b. This isolation may be achieved through the different browser contexts 502a-c. The application shell 106 may also have its own components that may be substantially isolated from the other components of the micro-frontends 108a-b. As shown in FIG. 5, the micro-frontend 108a can have components A-B, the micro-frontend 108b can have components C-D, and the application shell 106 can have components D-E. Components A-B may be substantially isolated from components D-E and E-F, components D-E may be substantially isolated from components A-B and E-F, and components E-F may be substantially isolated from components A-B and C-D.

Some browsers may include isolation mechanisms that help isolate browser windows from one another. For example, some website browsers execute each browser window as its own process, so that the operations occurring in one browser window are kept relatively isolated from the operations occurring in another browser window. As a result of this isolation, the application shell 106 and the micro-frontends 112a-b in one browser window 500 may be kept relatively isolated from the application shell and micro-frontends running in another browser window.

Some or all of the components of micro-frontend 108a can rely on the shared variable values that are maintained by the corresponding MFE synchronization handler 112a. For example, components A-B may both retrieve a current value for a shared variable from the value datastore of the MFE synchronization handler 112a. This can help ensure that both components remain in synch with one another. This can also reduce the number of communications between the MFE synchronization handler 112a and the shell synchronization handler 110, because separate communications need not be transmitted to synchronize each of the components A-B with the application shell 106.

Similarly, some or all of the components of micro-frontend 108b can rely on the shared variable values stored in the corresponding MFE synchronization handler 112b. For example, components C-D may both retrieve a current value for a shared variable from the value datastore of the MFE synchronization handler 112b. This can help ensure that both components remain in synch with one another. This can also reduce the number of communications between the MFE synchronization handler 112b and the shell synchronization handler 110, because separate communications need not be transmitted to synchronize each of the components C-D with the application shell 106.

The same is true for the application shell 106. Some or all of the components of application shell 106 can rely on the shared variable values stored in the corresponding shell synchronization handler 110. For example, components D-E may both retrieve a current value for a shared variable from the value datastore of the shell synchronization handler 110. This can help ensure that both components remain in synch with one another. This can also reduce the number of communications between the shell synchronization handler 110 and the MFE synchronization handlers 112a-b, because separate communications need not be transmitted to synchronize each of the components E-F with the micro-frontends 108a-b.

As shown in FIG. 5, there can be multiple MFE synchronization handlers 112a-b monitoring the communication channel 118 for messages indicating updates to shared variables. Upon detecting a message, the MFE synchronization handlers 112a-b can each compare a unique identifier in the message to their own unique identifiers to determine if there's a match. If there's a match, then the message is intended for that synchronization handler and the synchronization handler can process the message. Otherwise, the synchronization handler can ignore the message. For example, the shell synchronization handler 110 can transmit an updated value for a shared variable in a message 504 over a communication channel 118. The message 504 may include a unique identifier of the MFE synchronization handler 112a to indicate that the message is intended for the corresponding micro-frontend 108a. Based on the unique identifier in the message 504, the MFE synchronization handler 112a can determine that the message 504 is intended for it and process the message 504. Conversely, the other MFE synchronization handler 112b that is also monitoring the communication channel 118 can ignore the message 504 is irrelevant.

Although FIG. 5 shows a certain number and arrangement of components, this is intended to be illustrative and non-limiting. Other examples may include more components, fewer components, different components, or a different arrangement of the components shown in FIG. 5. For instance, another example may involve multiple application shells and dozens of micro-frontends, each having any number of individual components.

Figure 6:
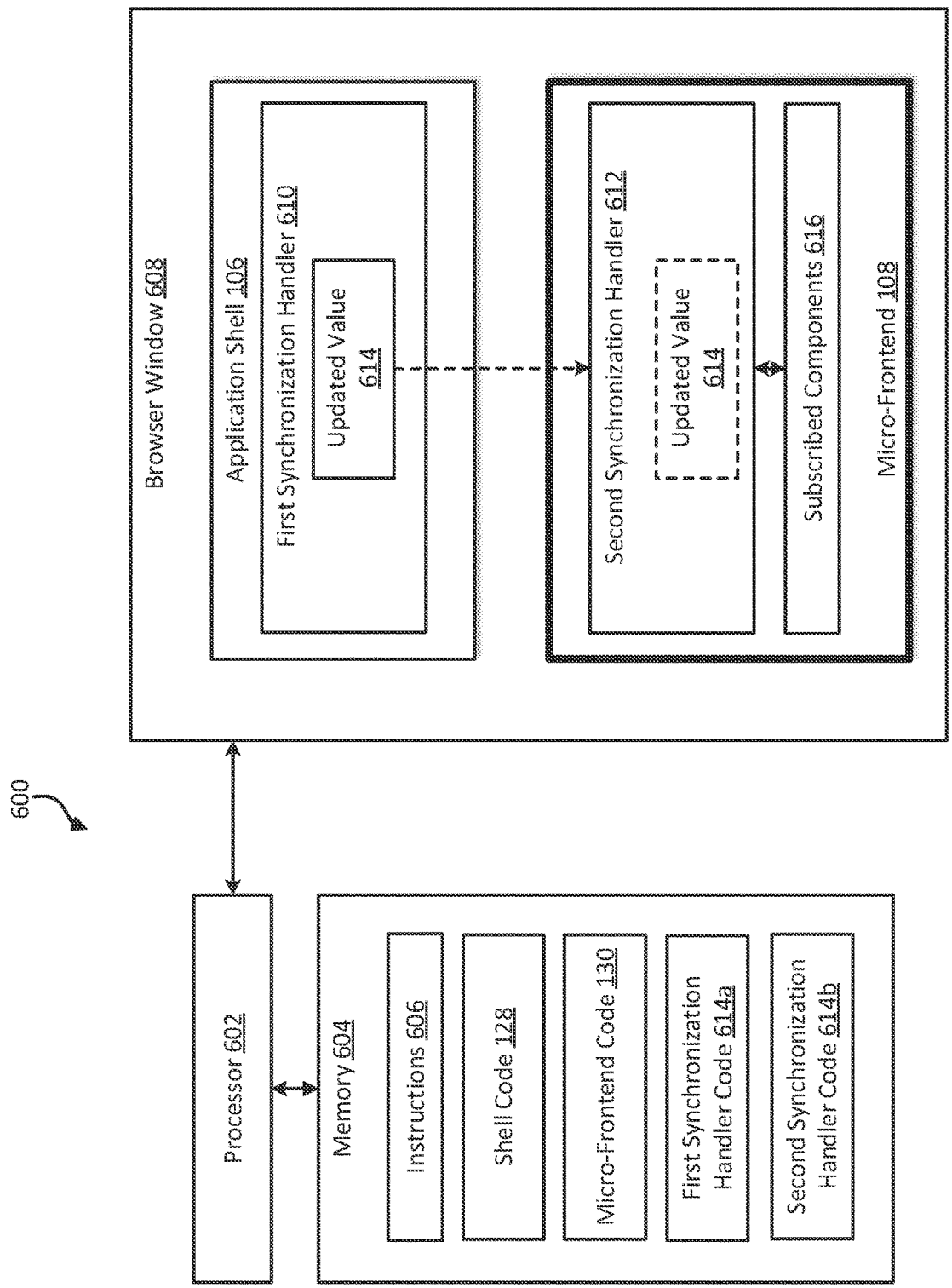
FIG. 6 shows an example of system for implementing some aspects of the present disclosure.

FIG. 6 shows an example of a system 600 for implementing some aspects of the present disclosure. The system 600 includes a processor 602 that is communicatively coupled to a memory 604. In some examples, the processor 602 and the memory 604 can be part of the same computing device. For example, the processor 602 and the memory 604 can be parts of the client device 102 of FIG. 1 or a server (e.g., in server system 124 of FIG. 1). In other examples, the processor 602 and the memory 604 can be distributed from one another and communicatively coupled via one or more networks.

The processor 602 can include one processor or multiple processors. Non-limiting examples of the processor 602 include a Field-Programmable Gate Array (FPGA), an application-specific integrated circuit (ASIC), or a microprocessor. The processor 602 can execute instructions 606 stored in the memory 604 to perform operations. The instructions 606 may include processor-specific instructions generated by a compiler or an interpreter from code written in any suitable computer-programming language, such as HTML, JavaScript, Java, CSS, Python, C, C++, or C#.

The memory 604 can include one memory or multiple memories. The memory 604 can be volatile or non-volatile. Non-volatile memory includes any type of memory that retains stored information when powered off. Examples of the memory 604 include electrically erasable and programmable read-only memory (EEPROM) or flash memory. At least some of the memory 604 includes a non-transitory computer-readable medium from which the processor 602 can read instructions 606. A computer-readable medium can include electronic, optical, magnetic, or other storage devices capable of providing the processor 602 with computer-readable instructions or other program code. Examples of a non-transitory computer-readable medium can include a magnetic disk, a memory chip, ROM, random-access memory (RAM), an ASIC, a configured processor, and optical storage.

In some examples, the memory 604 can include shell code 128 and micro-frontend code 130. The shell code 128 can be for an application shell 106 that is executable in a browser window 608. The micro-frontend code 130 can be for a micro-frontend 108 that is executable in the browser window 608, for example such that the micro-frontend 108 is a child of the application shell 106 in a document object model (DOM) hierarchy.

The memory 604 can also include first synchronization handler code 614a. The first synchronization handler code 614a can be for a first synchronization handler 610 that is executable in the browser window 608. The first synchronization handler code 614a and the first synchronization handler 610 may correspond to the shell synchronization handler code 132 and the shell synchronization handler 110 of FIG. 1, respectively.

The memory 604 can further include second synchronization handler code 614b. The second synchronization handler code 614b can be for a second synchronization handler 612 that is executable in the browser window 608. The second synchronization handler code 614b and the second synchronization handler 612 may correspond to the MFE synchronization handler code 134 and the MFE synchronization handler 112 of FIG. 1, respectively.

In some examples, the first synchronization handler 610 can determine an updated value 614 for a shared variable that is to be synchronized between the application shell 106 and one or more micro-frontends in the browser window 608. The first synchronization handler 610 can then transmit the updated value 614 to a second synchronization handler 612 of a micro-frontend 108 in the browser window 608 for use by the micro-frontend 108. The second synchronization handler 612 can receive the updated value 614 and provide the updated value 614 to one or more subscribed components 616 of the micro-frontend 108.

In some examples, the above operations can occur in a reverse order. For example, the second synchronization handler 612 can determine an updated value 614 for a shared variable that is to be synchronized between the micro-frontend 108 and the application shell 106. And the second synchronization handler 612 can transmit the updated value 614 to the first synchronization handler 610 of the application shell 106.

Figure 7:
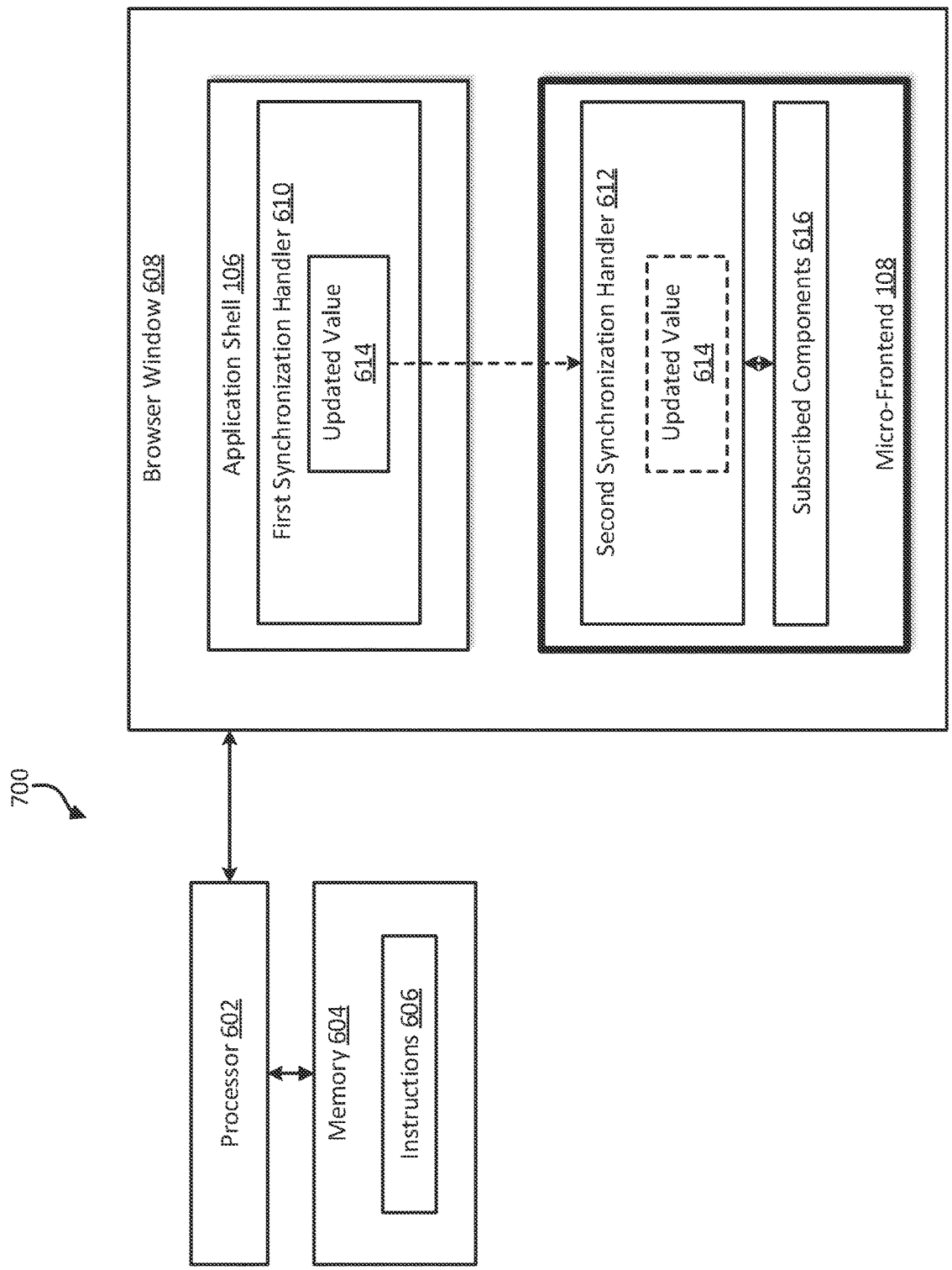
FIG. 7 shows yet another example of system for implementing some aspects of the present disclosure.

FIG. 7 shows an example of system 700 for implementing some aspects of the present disclosure. The system 700 includes a processor 602 that is communicatively coupled to a memory 604. The processor 602 and the memory 604 can be part of the same computing device or may be distributed from one another (e.g., remote from one another and communicatively coupled via one or more networks).

The processor 602 can execute the instructions 606 to perform operations. In some examples, the instructions 606 can correspond to the first synchronization handler 610 and therefore the processor 602 can execute the instructions 606 to perform the operations described herein with respect to the first synchronization handler 610. In other examples, the instructions 606 can correspond to the second synchronization handler 612 and therefore the processor 602 can execute the instructions 606 to perform the operations described herein with respect to the second synchronization handler 612.

In some examples, the first synchronization handler 610 can determine an updated value 614 for a shared variable, where the shared variable is a variable that is to be synchronized between the application shell 106 and one or more micro-frontends in the browser window 608. The first synchronization handler 610 can then transmit the updated value 614 to a second synchronization handler 612 of a micro-frontend 108 in the browser window 608. The second synchronization handler 612 can receive the updated value 614 and provide the updated value 614 to one or more subscribed components 616 of the micro-frontend 108.

Figure 8:
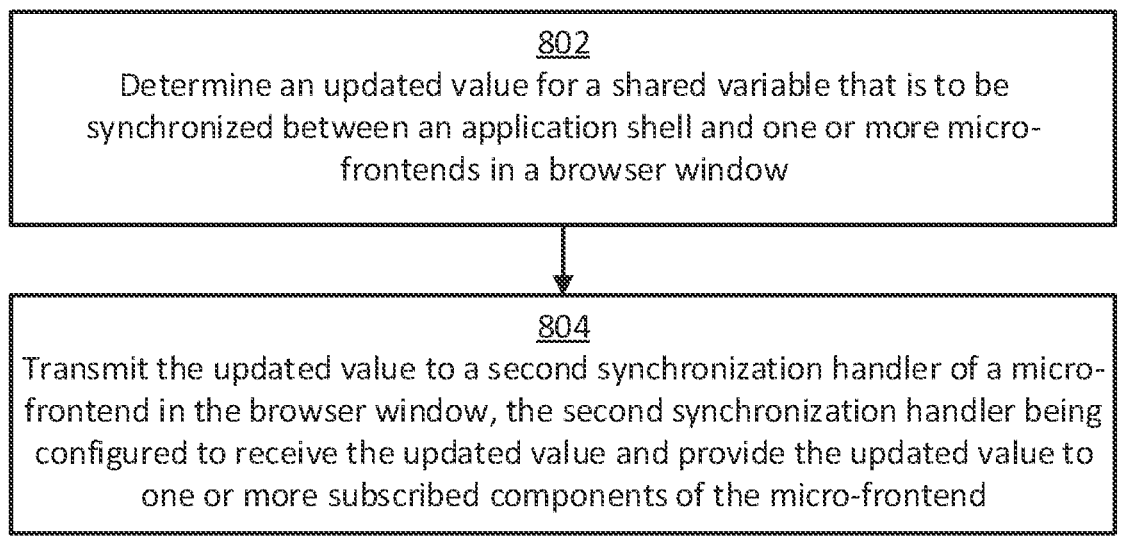
FIG. 8 shows a flow chart of an example of a process implemented by a first synchronization handler associated with an application shell according to some aspects of the present disclosure.

FIG. 8 shows a flow chart of an example of a process implemented by a first synchronization handler 610 associated with an application shell 106 according to some aspects of the present disclosure. Other examples may involve more operations, fewer operations, different operations, or a different order of the operations than is shown in FIG. 8. The operations of FIG. 8 will be described below with reference to the components of FIGS. 1 and 7 above.

In block 802, a first synchronization handler 610 determines an updated value 614 for a shared variable that is to be synchronized between the application shell 106 and one or more micro-frontends in the browser window 608. The first synchronization handler 610 can correspond to an application shell 106 executing in a browser window 608 (e.g., an individual browser tab). The first synchronization handler 610 can determine the updated value 614 by receiving the updated value 614 from the application shell 106, for example as a result of one or more operations performed by the application shell 106. Alternatively, the first synchronization handler 610 can determine the updated value 614 by receiving the updated value 614 from another component (e.g., a browser object) that is distinct from the application shell 106, for example as a result of one or more operations performed by the component.

In block 804, the first synchronization handler 610 transmits the updated value 614 to the second synchronization handler 612 of a micro-frontend 108 in the browser window 608. The first synchronization handler 610 may transmit the updated value 614 to the second synchronization handler 612 in a message over a communication channel 118 that is accessible to the second synchronization handler 612. The second synchronization handler 612 can receive the updated value 614 and provide the updated value 614 to one or more subscribed components 616 of the micro-frontend 108. For example, the second synchronization handler 612 can receive the updated value 614 for the shared variable, consult a subscription datastore 126 to determine one or more callbacks associated with the shared variable, and execute the callbacks to supply the updated value 614 to the one or more subscribed components of the micro-frontend 108.

In some cases, multiple synchronization handlers (e.g., corresponding to multiple micro-frontends) can monitor the communication channel for messages. Upon detecting a message, the synchronization handlers can each compare a unique identifier in the message to their own unique identifiers to determine if there's a match. If there's a match, then the message is intended for that synchronization handler and the synchronization handler can process the message. Otherwise, the synchronization handler can ignore the message. In some examples, the first synchronization handler 610 can transmit the updated value 614 in a message over a communication channel 118. The message may include a unique identifier of the second synchronization handler 612 to indicate that the message is intended for the corresponding micro-frontend 108. Based on the unique identifier in the message, the second synchronization handler 612 can determine that the message is intended for it and process the message. Conversely, other synchronization handlers that may also be monitoring the communication channel 118 can ignore the message is irrelevant.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A non-transitory computer-readable medium comprising program code for a first synchronization handler of an application shell that is executable in a browser window of a website browser, the browser window being within the website browser, the first synchronization handler being configured to:
   determine an updated value for a shared variable that is to be synchronized between the application shell and a micro-frontend in the browser window, wherein the micro-frontend is a child of the application shell in a document object model (DOM) hierarchy; and
   transmit the updated value to a second synchronization handler of the micro-frontend in the browser window, the second synchronization handler being configured to receive the updated value and provide the updated value to one or more subscribed components of the micro-frontend, wherein the second synchronization handler includes a subscription datastore indicating which components of the micro-frontend are subscribed to receive updated values from the application shell, and wherein the subscription datastore includes identifiers of the one or more subscribed components.

2. The non-transitory computer-readable medium of claim 1, wherein the first synchronization handler is further configured to:
   receive a request from the second synchronization handler for a default value of the shared variable; and
   in response to receiving the request:
      determine the default value of the shared variable by interacting with an application programming interface of the first synchronization handler;
      based on determining the default value, transmit the default value to the second synchronization handler; and
      store the default value in a value datastore of the first synchronization handler.

3. The non-transitory computer-readable medium of claim 1, wherein the subscription datastore includes executable callback code for each of the one or more subscribed components, the executable callback code being usable to provide the updated value to the one or more subscribed components.

4. The non-transitory computer-readable medium of claim 3, wherein the first synchronization handler is configured to transmit the updated value in one or more messages over a communication channel to a plurality of synchronization handlers of a plurality of micro-frontends in the browser window.

5. The non-transitory computer-readable medium of claim 1, wherein the application shell is configured to communicate with a plurality of micro-frontends in the browser window, the plurality of micro-frontends including a first micro-frontend that is executable in a first context of the browser window and a second micro-frontend that is executable in a second context of the browser window, the second context being distinct from the first context.

6. The non-transitory computer-readable medium of claim 5, wherein the first context is an iFrame and the second context is external to the iFrame.

7. The non-transitory computer-readable medium of claim 1, wherein the first synchronization handler is configured to store the updated value in a first value datastore that is inaccessible to the second synchronization handler, and wherein the second synchronization handler is configured to store the updated value in a second value datastore that is inaccessible to the first synchronization handler.

8. The non-transitory computer-readable medium of claim 7, wherein the updated value is a first updated value, and wherein the second synchronization handler is configured to:
   determine a second updated value for the shared variable;
   store the second updated value in the second value datastore; and
   transmit the second updated value to the first synchronization handler of the application shell, the first synchronization handler being configured to store the second updated value for the shared variable in the first value datastore.

9. The non-transitory computer-readable medium of claim 1, wherein the second synchronization handler is configured to, subsequent to receiving the updated value from the first synchronization handler:
receive a request from a component of the micro-frontend to unsubscribe from receiving updates for the shared variable; and
in response to receiving the request, unsubscribe the component from receiving the updates for the shared variable by removing a corresponding entry from the subscription datastore of the second synchronization handler.

10. A method comprising:
determining, by a first synchronization handler of an application shell that is executing in a browser window within a website browser, an updated value for a shared variable that is to be synchronized between the application shell and a micro-frontend executing in the browser window, wherein the application shell is configured to communicate with a plurality of micro-frontends in the browser window, the plurality of micro-frontends including a first micro-frontend that is executing in a first context of the browser window and a second micro-frontend that is executing in a second context of the browser window, the second context being distinct from the first context; and
transmitting, by the first synchronization handler, the updated value to a second synchronization handler of the micro-frontend in the browser window, the second synchronization handler being configured to receive the updated value and provide the updated value to one or more subscribed components of the micro-frontend, wherein the second synchronization handler includes a subscription datastore indicating which components of the micro-frontend are subscribed to receive updated values from the application shell, and wherein the subscription datastore includes identifiers of the one or more subscribed components.

11. The method of claim 10, further comprising, prior to determining the updated value for the shared variable:
receiving, by the first synchronization handler, a request from the second synchronization handler for a default value of the shared variable; and
in response to receiving the request:
determining, by the first synchronization handler, the default value of the shared variable by interacting with an application programming interface of the first synchronization handler;
based on determining the default value, transmitting, by the first synchronization handler, the default value to the second synchronization handler; and
storing, by the first synchronization handler, the default value in a value datastore of the first synchronization handler.

12. The method of claim 10, wherein the subscription datastore includes executable callback code for each of the one or more subscribed components, the executable callback code being usable to provide the updated value to the one or more subscribed components.

13. The method of claim 12, wherein the first synchronization handler transmits the updated value in one or more messages over a communication channel to a plurality of synchronization handlers of the plurality of micro-frontends in the browser window.

14. The method of claim 10, wherein the first context is an iFrame and the second context is external to the iFrame.

15. The method of claim 10, wherein the first synchronization handler is configured to store the updated value in a first value datastore that is inaccessible to the second synchronization handler, and wherein the second synchronization handler is configured to store the updated value in a second value datastore that is inaccessible to the first synchronization handler.

16. The method of claim 15, wherein the updated value is a first updated value, and wherein the second synchronization handler:
determines a second updated value for the shared variable;
stores the second updated value in the second value datastore; and
transmits the second updated value to the first synchronization handler of the application shell, wherein the first synchronization handler stores the second updated value for the shared variable in the first value datastore.

17. The method of claim 10, wherein the one or more subscribed components includes a first component of the micro-frontend and a second component of the micro-frontend, and wherein the second synchronization handler is configured to, subsequent to receiving the updated value from the first synchronization handler:
receive a request from the first component of the micro-frontend to unsubscribe from receiving updates for the shared variable; and
in response to receiving the request, unsubscribe the first component from receiving the updates for the shared variable by removing a corresponding entry from the subscription datastore of the second synchronization handler.

18. The method of claim 10, wherein the micro-frontend is a child of the application shell in a document object model (DOM) hierarchy.

19. A system comprising:
a processor; and
a memory including instructions for a first synchronization handler of an application shell that is executable in a browser window within a website browser, the first synchronization handler being executable by the processor to:
determine an updated value for a shared variable that is to be synchronized between the application shell and a micro-frontend in the browser window; and
transmit the updated value to a second synchronization handler of the micro-frontend in the browser window, the second synchronization handler being configured to receive the updated value and provide the updated value to one or more subscribed components of the micro-frontend, wherein the second synchronization handler includes a subscription datastore indicating which components of the micro-frontend are subscribed to receive updated values from the application shell, the subscription datastore including identifiers of the one or more subscribed components, wherein the subscription datastore includes executable callback code for each of the one or more subscribed components, the executable callback code being usable to provide the updated value to the one or more subscribed components.

20. The system of claim 19, wherein the micro-frontend is a child of the application shell in a document object model (DOM) hierarchy.

21. The system of claim 19, wherein the application shell is configured to communicate with a plurality of micro-frontends in the browser window, the plurality of micro-frontends including a first micro-frontend that is executing in a first context of the browser window and a second micro-frontend that is executing in a second context of the browser window, the second context being distinct from the first context.

* * * * *